United States Patent [19]

Wise

[11] 4,346,436

[45] Aug. 24, 1982

[54] INTERPRETIVE DIGITAL DATA PROCESSOR COMPRISED OF A MULTI-LEVEL HIERARCHY OF PROCESSORS AND HAVING PROGRAM PROTECTION MEANS

[75] Inventor: John B. Wise, Banstead, England

[73] Assignee: Burroughs Corporation, Detroit, Mich.

[21] Appl. No.: 35,588

[22] Filed: May 3, 1979

Related U.S. Application Data

[63] Continuation of Ser. No. 23,342, Mar. 23, 1979.

[51] Int. Cl.³ .......................... G06F 9/38; G06F 9/30; G06F 9/32
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,665,421 | 5/1972 | Rehhauser et al. | 364/200 |
| 3,735,363 | 5/1973 | Beers et al. | 364/200 |
| 3,792,441 | 2/1974 | Wymore et al. | 364/200 |
| 3,983,539 | 9/1976 | Faber et al. | 364/200 |
| 4,181,935 | 1/1980 | Feeser et al. | 364/200 |

Primary Examiner—Gareth D. Shaw
Assistant Examiner—John G. Mills, III
Attorney, Agent, or Firm—Nathan Cass; Kevin R. Peterson; David G. Rasmussen

[57] ABSTRACT

An interpretive-type digital data processing system, providing program protection and supporting one or more input high level languages. The system is comprised of a multi-level hierarchy of processors designatable in descending order as S, M, N and P processors is operable so that the processor at each level interprets instructions at the level above in a pipelined manner. Each of the S, M and N processors is provided with its own memory for respectively storing S, M and N instructions which are selected and fetched during system operation so as to provide a hierarchical interpretation of each input high level language. This is accomplished in a manner such that fetched M instructions are first processed by the N-processor in accordance with corresponding fetched N instructions before being employed by the M-processor for processing data.

12 Claims, 8 Drawing Figures

INTERPRETIVE DIGITAL DATA PROCESSOR COMPRISED OF A MULTI-LEVEL HIERARCHY OF PROCESSORS AND HAVING PROGRAM PROTECTION MEANS

This is a continuation, of application Ser. No. 23,342, filed Mar. 23, 1979.

CROSS-REFERENCE TO RELATED PATENT APPLICATION

Patent application Ser. No. 23,342, filed Mar. 23, 1979, and Ser. No. 23,343, filed Mar. 23, 1979, contain subject matter related to this application.

BACKGROUND OF THE INVENTION

The present invention relates generally to improved means and methods for providing data processing in a microprogrammed electronic digital processor. More particularly, the present invention is directed to an improved interpretive-type processor employing a hierarchy of processor levels.

As is well known, an interpretive processor provides for supporting multiple high level languages through the use of a number of interpreters, each of which is designed to support one or more high level languages. The Burroughs B 1700 and B 1800 computer systems are examples of commercially available computers of this type. As is typical of an interpretive processor, each input high level language (source program) executes on a virtual (soft) processor (referred to as an S-processor in the Burroughs B 1700) which has its own special set of instructions (called S-instructions or S-ops in the B 1700) that are specially tailored to the needs of the respective input high level language or languages to be interpreted thereby. Typically, there may be a number of different S-processors. For example, in a typical system there may be separate S-processors for COBOL and FORTRAN.

Descriptions of processors in general and the Burroughs B 1700 in particular may be found, for example, in the article "Design of the Burroughs B 1700," W. T. Wilner, AFIPS Conference Proc., 1972, Vol. 41, Part I, pp. 489–497; in the book "Foundations of Microprogramming," Agrausala, et al., Academic Press, Inc., 1976, pp. 120–139; and also in the article "Microprogramming-Another Look at Internal Computer Control," Michael J. Flynn, IEEE Proc., Vol. 63, No. 11, November, 1975, pp. 1554–1567. Also, the commonly assigned U.S. Pat. Nos. 3,665,421; 3,680,058; 3,735,363; 3,739,352; 3,781,812; and 3,792,441 are directed to various features of an interpretive processor. The subject matter of these articles and patents are to be considered as incorporated herein. In addition, the commonly assigned copending application Ser. No. 830,157, filed Sept. 2, 1977, now U.S. Pat. No. 4,181,935, issued Jan. 1, 1980, W. E. Feeser and M. L. C. Gerhold, inventors, discloses an interpretive processor employing a cache-type of microinstruction control memory.

SUMMARY OF THE PRESENT INVENTION

The primary object of the present invention is to provide an improved interpretive-type processor having enhanced capabilities with regard to architectural design, programming flexibility, and system performance. This is accomplished in a preferred embodiment of the present invention by the provision of an interpretive processor comprised of a multi-level hierarchy of processors wherein the processor at each level interprets instructions on the level above. More specifically, in the preferred embodiment, four processor levels are provided which will be respectively designated as S, M, N and P levels. The previously referred to S-processors each operate at the S-level. Below the S-level is the M-level at which S-ops are interpreted using a single M-processor which interprets the S-ops using its own set of instructions called M-instructions or M-ops. In the preferred embodiment, the M-processor is somewhat virtual, but many of its facilities are provided directly in hardware.

Below the M-level is the N-level at which M-ops are interpreted using a single N-processor which interprets the M-ops using its own set of instructions called N-instructions or N-ops. In the preferred embodiment, all of the facilities of the N-processor have a physical implementation.

Below the N-level is the P-level at which N-ops are executed using a single P-processor which in the preferred embodiment is entirely hard and is implemented using combinatorial logic circuitry comprising, for example, ROMs and gates.

The multiple processor levels considered above are provided in the preferred embodiment in a manner so as to be transparent to a programmer at the S-level. This means that the S-ops see no reflection of the fact that there is an M-processor which interprets the S-ops, an N-processor which interprets the M-ops and a P-processor which executes the N-ops.

The specific nature of the invention as well as other objects, features, advantages and uses thereof will become readily apparent from the following detailed description and accompanying drawings.

PART I-GENERAL DESCRIPTION

Figure 1:
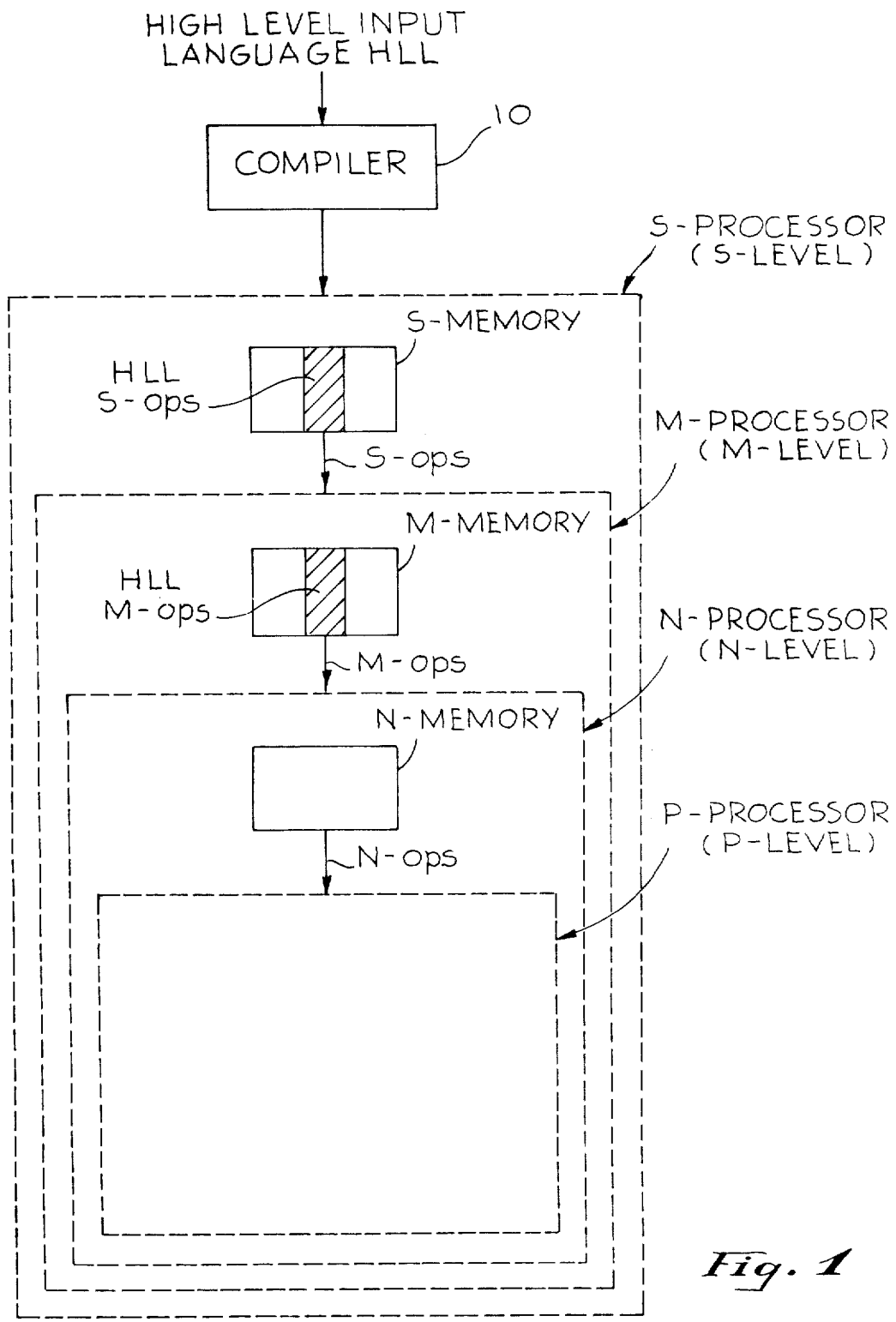
FIG. 1 is a schematic diagram illustrating the multi-level hierarchy of processors employed in a preferred embodiment of the invention.

Introduction (FIG. 1)

FIG. 1 is a diagram schematically illustrating the multi-level interpretive hierarchy employed in the preferred embodiment of the invention for an assumed high level input language HLL. As shown, the HLL input language is compiled by a compiler 10 to provide a set of HLL S-ops which are stored in an S-memory within the S-processor. In addition, a corresponding set of HLL M-ops for interpreting the HLL S-ops are stored in an M-memory provided within the M-processor. It will be understood that the S-memory and M-memory may also respectively store S-ops and M-ops corresponding to other high level input languages. It will also be understood that overflow M-op storage may be provided in the S-memory and brought into the M-memory as required.

During performance of an HLL program in the example illustrated in FIG. 1, each required HLL S-op is fetched and applied to the M-processor, resulting in the selection of a corresponding one or more HLL M-ops therefrom, as required for performing each fetched HLL S-op. If a required M-op is not in the M-memory, it is obtained from the S-memory, which may advantageously be implemented, for example, in the manner employed in the aforementioned commercially available B 1700 system, or in the improved manner employing cache memory principles disclosed in the aforementioned commonly assigned copending patent application Ser. No. 830,157, filed Sept. 2, 1977.

As further illustrated in FIG. 1, each M-op obtained from the M-memory during interpretation of an S-op is in turn applied to an N-processor for interpretation which is likewise accomplished in an interpretive manner as a result of causing selection of one or more corresponding N-ops stored in an N-memory contained within the M-processor, each selected N-op being in turn executed by the P-processor.

TIMING CONSIDERATIONS

The general manner in which clocking is provided for the multi-level design of the preferred embodiment will next be considered. Initially, it is to be understood that the multi-level concept is also followed in the provision of clocking. Accordingly, there is provided an M-level clock L2, an N-level clock L1, and a P-level clock L0. Clock L2 is determined by signals from the N-level, clock L1 is determined by signals from the P-level, and clock L0 is determined by combinatorial logic provided within the P-processor.

In the preferred embodiment, clocks L0, L1 and L2 are maintained in a strict time relationship. The number of L2 clocks for an operation may be less than or equal to the number of L1 clocks which, in turn, may be less than or equal to the number of L0 clocks. This is provided because a processor at a lower level may have to perform multiple operations for each corresponding operation of a processor at the next higher level. A typical set of clocks which may be provided, for example, is two L2 clocks, one L1 clock and one L0 clock.

PROGRAM PROTECTION

Program protection is provided to insure that, through error or malicious intent, one program cannot interfere with the execution of other programs nor in any way alter any other program's data or files. In the preferred embodiment, protection of a program's data and instruction (code) areas is provided by requiring validation of each access to main memory (which is the previously referred to S-memory). The validation entails checking the type and location of access against a list of descriptors which detail the allowable accesses for a particular execution of a specific program.

The hardware provided for S-memory access validation includes a physical module called the Associative Memory Unit AMU. Each time an access to S-memory is initiated, the AMU is checked for an entry, called a "Memory Access Descriptor" MAD, for that portion of the program's memory space. If the MAD is found, the address used by the program, which is a virtual address, is converted into a physical address and is checked for correct bounds and access type. Any violations are reported to the system for suitable action. If the MAD is not found, this is also reported. If the attempted access is allowable, an appropriate MAD is inserted into the AMU and the interrupted program may be resumed. Otherwise, the attempted access is considered a protection violation and the program is stopped with an error report.

BLOCK STRUCTURE

In the preferred embodiment, instead of employing a number of fixed-name registers for the microprogrammer to use, as is conventionally done, the M-processor provides a local scratchpad memory for working storage called Direct Access Memory DAM. It is from DAM that most M-ops obtain the operands of the instruction. Space in DAM is allocated in blocks as a stack, with addresses translated from the microprogrammer's point-relative form to an absolute location by the hardware. This system, of using pointer based addressing for working storage in the processor, frees the microprogrammer from the problems of allocating fixed registers in the processor. The pointers are managed so that allocation of space is completely automatic and transparent to the writer of an S-interpreter. When subroutines are called, the pointer values for the calling routine are stored by the hardware and new pointer values are made as required. Upon returning from the subroutine, the former pointer values are restored. This is hardware managed, through the use of a stack. Along with stored pointer values, this stack maintains instruction addresses from the calling routine(s). This use of pointer-relative addressing within the processor working storage coupled with the use of "block-stacking" for space allocation is well suited to the use of a high-level microprogramming language, as it corresponds well to the method of storage management used by most modern block structured languages.

PART 2-PREFERRED IMPLEMENTATIONS

Figure 2:
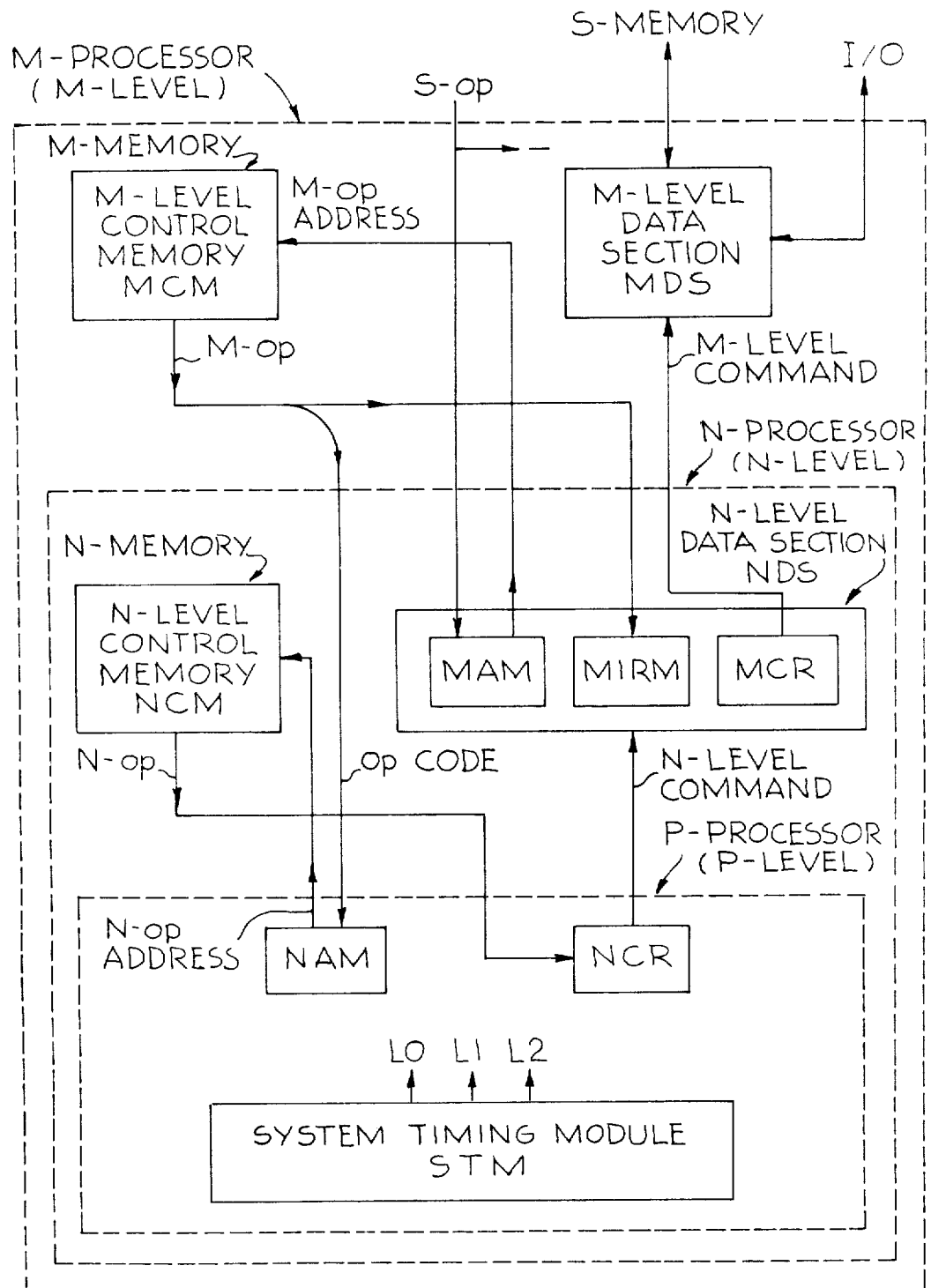
FIG. 2 is a schematic and block diagram illustrating a preferred implementation of FIG. 1.

Basic Implementation (FIG. 2)

The basic implementation provided for the preferred embodiment of the invention will now be considered with reference to FIG. 2. Because the improvements of the present invention are primarily encompassed in those portions of the system residing below the S-level, FIG. 2 is directed to the basic organization and primary elements of the M-level and those levels below. In this regard, note that the relationship of the various portions of FIG. 2 to the multi-level hierarchy are indicated by their locations within the dashed line level indications provided. It is to be understood that the organization and structure above the M-level required for each S-processor may be implemented in a conventional manner, such as is employed, for example, in Burroughs B 1700 and B 1800 systems and as disclosed in the aforementioned articles and patents.

As illustrated by the dashed-line boxes in FIG. 2, the M-processor comprises an M-level Control Memory MCM (which is the M-memory shown in FIG. 1), an M-level Data Section MDS and the N-processor. The N-processor serves as the control section for the M-processor and in turn comprises an N-level Control Memory NCM (which is the N-memory shown in FIG.

1), an N-level Data Section NDS, and the P-processor which serves as the control section for the N-processor.

The basic operation of the embodiment illustrated in FIG. 2 is such that M-ops are sequentially fetched from the M-level Control Memory MCM using addresses provided by a Memory Address Module MAM (located within NDS) in response to an applied S-op. Each M-op accessed from MCM is applied to an M-op Receiving Module M1RM (also located within NDS), while the op code portion of the M-op (which indicates the operation to be performed) is sent to an N-op Address Module NAM (located within the P-processor). This op code is used by NAM to start an addressing sequence for the N-level Control Memory NCM for sequentially accessing the N-ops therefrom as required to perform the indicated M-op. Each N-op thus obtained from NCM is loaded into a Control Register NCR (located within the P-processor) whose outputs serve as an N-level Command which controls actions in NDS. These actions in NDS perform whatever decoding operation is indicated by the N-op on the corresponding M-op and results in a set of M-level control signals being loaded into a Control Register MCR (located within NDS). The outputs from MCR constitute an M-level Command which is applied to MDS to control data movement and computation as required to perform the indicated M-op. Some M-ops may require just one operation in MDS. If this is the case, then MAM will be updated and the next M-op will be loaded from MCM into M1RM. A more complex instruction may require several steps, in which case M1RM and MAM remain unchanged until the end. The complete cycle from NCM to NCR through NDS and into MCR is repeated for each step that is required in MDS in order to execute each accessed M-op. During this operation, each level of logic receives its respective clock L0, L1 or L2 from a System Timing Module STM (located within the P-processor). These clocks are related so as to permit each lower level to perform more steps than the level above where required. By having these three levels receiving separate clocks and using NCR and MCR to separate them, it is possible to have up to three instructions in various stages of execution at once. These three stages are typically M-op fetch, M-op decode, and M-op execute.

In connection with the preferred embodiment generally illustrated in FIG. 2, it will be helpful at this point in the description to provide the following definitions of various terms as an aid in better understanding the descriptions of the more specific implementations to follow:

M-op—A bit pattern fetched from MCM in response to an address provided by MAM and serving as a microinstruction of the M-processor.

N-op—A bit pattern fetched from NCM in response to an address provided by NAM and serving as a microinstruction of the N-processor.

N-level Command—A control pattern provided at the output of NCR as a result of loading one or more N-ops fetched from NCM into NCR. An N-level Command remains valid for an N-level clock period.

N-level Action—The effect over an L1 clock period produced by an N-level Command on NDS to which it is applied.

M-level Command—A control pattern provided at the output of MCR as a result of loading therein the results of the performance of an N-level Action in NDS. An M-level Command remains valid for an M-level clock period.

M-level Action—The effect over an L2 clock period produced by an M-level Command on MDS to which it is applied.

M-LEVEL CONTROL MEMORY MCM (FIGS. 1 and 2)

MCM is addressed by MAM (FIG. 2) and contains M-level instructions—that is, M-ops—which are used in interpreting the S-ops, as explained previously. Preferably MCM is a cache-type index associative memory of the type disclosed in the aforementioned commonly assigned patent application Ser. No. 830,157, filed Sept. 2, 1977.

The address provided by MAM typically contains a Key field, an Index field, and a Word Select field. M-ops are organized into "blocks" with each block typically containing two M-ops. Blocks are in turn organized into "classes" which are sequentially numbered. The index field provided by MAM directly addresses the class containing the addressed M-op. With each block is associated a key value and a validity bit. An associative comparison of the value in this key with the key field provided by MAM is used to distinguish the addressed block from the other block in the addressed class. The validity bit is used to indicate whether the addressed block is within the domain of the current process. The keys corresponding to the blocks of a given class are accessed simultaneously using the index field provided by MAM. Then comparisons are made in an attempt to find a key which matches the key field provided by MAM. If a match is found, the corresponding block is then accessed using the index field provided by MAM and the results of the key comparisons. The correct M-op of the two typically contained in an accessed block is determined from the Word Select field provided by MAM. Block replacement occurs in MCM when the block containing an addressed M-op is not in MCM, as indicated by the failure to obtain a match. In such a case, the N-processor initiates an S-memory access to load the desired block in a manner so that the most recently used M-ops will reside in MCM.

Figure 3:
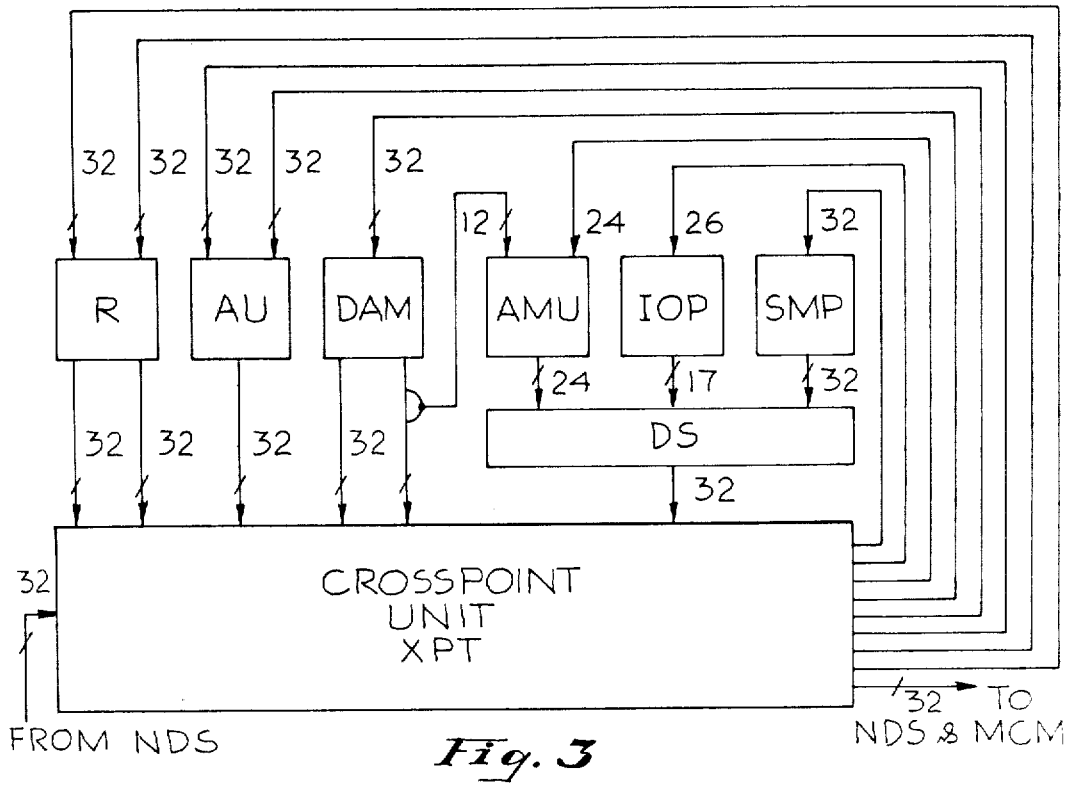
FIG. 3 is an electrical block diagram illustrating a preferred implementation for the M-level data section MDS of FIG. 2.

M-LEVEL DATA SECTION (MDS) (FIGS. 2 and 3)

FIG. 3 illustrates a preferred implementation for MDS. The implementation of the various components of MDS shown in FIG. 3 is described below.

CROSSPOINT UNIT XPT (FIG. 3)

The Crosspoint Unit XPT is the main data bussing structure for MDS. It is responsible for most of the data path interconnections between modules of MDS, and may typically provide 32-bit wide data paths. In such a case, XPT may typically serve as a seven input, nine output switch, where four of the outputs always carry the same data, but are buffered separately because of loading rules. Therefore, the XPT may logically be viewed as a seven input, six output device where each of the outputs can take data from any of the inputs, independently of each other. Also, any output can take the value zero.

XPT also provides for masking. Two of its outputs (the ones which supply data to the Arithmetic Unit AU) may typically have either the upper 12 bits or the lower 20 bits forced to zeroes while the other part carries data selected from one of the inputs.

XPT additionally provides for merging. One of the outputs of XPT (the one which supplies data to DAM) typically has three possible merging operations. Any of three fields of this output may independently select its data from a particular input while the data for each of the remaining fields selects its output data from any of the other inputs. The three fields are typically the upper 12 bits, the next 4 bits, and the lower 16 bits. This provides a merging ability since data from DAM can be changed (e.g., shifted or added to) and then merged in portions with the original unchanged data before it is sent back to DAM to be stored. As an example, an addition can be performed, 32 bits wide, and that sum selected as the source for the output's lower 20 bits, while the upper 12 bits are "merged" by forcing their source to be the original DAM data. This allows operations to be performed on subfields of DAM words without changing the surrounding fields. The subfields used are typically the upper 12 bits, the upper 16 bits, the lower 20 bits and the lower 16 bits, which can be achieved with various combinations of the 12-4-16 bit division of the merge function.

DATA SELECTOR DS (FIG. 3)

Data Selector (DS) may typically be a four input, single output selector providing a width of 32 bits. DS basically serves to expand the number of inputs to XPT. Accordingly, it should be understood that any reference to the inputs of XPT will be meant to include the inputs of DS, since this module can be viewed logically as an extension of XPT.

DIRECT ACCESS MEMORY DAM (FIG. 3)

DAM may typically comprise 256 32-bit words of scratchpad memory with two read ports and a single write port. The term "direct access" is used because DAM addresses are found in, and access enabled by a single M-op. DAM typically stores the operands which are to be used with the M-ops as well as Canonical Descriptors CD. The purpose of a Canonical Descriptor CD is to describe information structures within a virtual machine. The description typically includes address, length, type and perhaps some other miscellaneous information. The application of a CD is during S-memory (FIG. 1) accesses, when the CD is used and (if necessary) updated by the hardware. A CD is "canonical" in the sense that before any information structure is operated on by the processor, its description is reduced to the form of a CD. This is done because CDs are used in providing controlled access to the S-memory (FIG. 1). In this regard, it is to be noted that there is no physical distinction which separates CDs from other words stored in DAM. A CD is recognized as such only when it is given as the location to be used for addressing the S-memory. Thus, a CD is a logical concept and has no hardware "tag" or other physical characteristic.

A CD is typically 32-bits long and is divided into two parts, A and B. Part A contains a virtual address into the S-memory consisting of a Memory Access Block Number MABN and a displacement field D. MABN occupies the left most 12 bits of Part A and serves as the name of a Memory Access Descriptor MAD. The displacement field D comprises the lower 20 bits of Part A. Part B comprises a Flags field F and a Length field L. F is a series of bits that are typically encoded into a language dependent key to help identify a particular language dependent information structure. F occupies the left most 12 bits of Part B. L contains the bit length of the information structure and occupies the right most 20 bits of Part B.

DAM may typically comprise two random access storage sections each capable of outputting 32-bit data independently during a read access, while both accepting the same input data during writing. Each storage section typically provides for 256 words of storage, and are duplicates of one another so as to permit concurrent access to two words. DAM is typically managed as a stack and includes pointers for this purpose.

ARITHMETIC UNIT AU (FIG. 3)

The Arithmetic Unit AU performs arithmetic and logic functions on M-level data. AU typically has two 32-bit input ports and one 32-bit output port for data functions. AU also provides for storing a carry-out or borrow signal which may result from an operation performed thereby.

ROTATOR R (FIG. 3)

Rotator R typically has two 32-bit data inputs from the Crosspoint Unit XPT and two 32-bit data outputs to XPT. There are typically seven control inputs, five for shift or rotate amount (number of bits, 0–31) and two for function. In typical operation, Rotator R treats the incoming data as though it were in separate 32-bit rotators. The data in one input port is rotated (circular) to the right, while the data in the other input port is rotated to the left. The two data paths are kept separate, but the amount of rotation is the same for both parts.

ASSOCIATIVE MEMORY UNIT AMU (FIG. 3)

AMU is used to store Memory Access Descriptors MADs. MADs are M-level data structures containing the base address of a logical segment in S-memory and the length and access rights for the segment. The Memory Access Block Number MABN of a Canonical Descriptor CD obtained from DAM or from MAM (FIGS. 2 and 4) is used as the key to associatively search the AMU. AMU is preferably built as an indexed associative memory, similar to MCM, but is typically much smaller.

AMU has two data input ports and a single data output port. An output line also goes to MCM to indicate a privileged block during replacement operations between the S-memory and MCM. One input port of AMU is typically 12 bits wide and comes directly from DAM. This port carries the Memory Access Block Number MABN of a Canonical Descriptor CD during an S-memory access. The other input is from the XPT unit and typically carries 24 bits of data used to refill blocks within the AMU with new MADs. The single data output port is typically 24 bits wide and supplies MAD information to the XPT for use in computations done during S-memory access.

AMU is typically implemented with 32 classes of 2 blocks each, with each block typically storing two words of 24 bits apiece. The first word contains the 24-bit physical base address of a logical segment in S-memory. The second word contains a 20-bit segment length limit and four access rights bits. Three of these access rights bits indicate the type of access allowed for the segment which is read, write or execute. The fourth bit indicates a privileged code segment. Programs executed from a privileged code segment are allowed to use the full set of M-ops, while non-privileged programs have a restricted subset of M-ops.

Logic is included in AMU to detect an access rights violation during an S-memory access by comparing the type of operation with the access rights bits stored with the MAD being used. Error signals are sent to the N-processor to cause an interrupt should an access violation occur. Also, a "miss" signal is sent from AMU to cause an interrupt should the association fail to produce a match in the key stores for the MABN of the Canonical Descriptor CD being used.

A special feature of AMU is its treatment of the MAD for MABN=0. This MABN is, by convention, reserved for controlling privileged accesses and thus is always present and never overwritten during a normal block replacement operation. AMU includes logic which guarantees that the MAD entry for MABN=0 can only be changed by explicit (privileged) instructions to do so. The MAD for MABN=0 is thus a special case and is stored in a special place separate from, and in addition to, the other 64 MADs which AMU typically stores.

S-MEMORY PORT SMP (FIG. 3)

The S-Memory Port SMP is the processor's connection with the control portions associated with the S-memory (FIG. 1). The primary functions of SMP are to provide appropriate level conversion, as well as parity generation and checking on transferred data. Incoming data is sent to XPT from SMP through Data Selector DS, while condition signals are sent to the N-processor. The outgoing data lines originate from XPT, while the outgoing control signals are forwarded from the N-processor.

I/O PORT IOP (FIG. 3)

IOP is the processor's link with the I/O portions of the system and, like SMP performs level conversion and parity generation and checking. IOP receives data lines from XPT which appropriately converts to a desired level. Typically, sixteen lines represent actual data for which a parity bit is generated, while six lines serve to provide control or variant signals. Sixteen data bits, a parity line, and four condition signals are typically received by IOP and converted to appropriate levels. The data is sent to XPT through Data Selector DS while the condition lines go to the N-processor.

N-LEVEL CONTROL MEMORY NCM (FIG. 2)

NCM is addressed by the Nano Address Module NAM (FIG. 2) and contains N-level instructions—that is, N-ops—which are used in interpreting the M-ops, as explained previously. Typically, NCM operates as a read-only store during system operation and is loaded at system initialization time. NCM also includes means for detecting invalid and privileged M-ops. NCM is accessed at the start of the interpretation of each M-op. Detection of an invalid or privileged situation causes NCM to signal NDS for preventing execution of the non-privileged or invalid M-ops.

N-LEVEL DATA SECTION NDS (FIGS. 2 AND 4)

Figure 4:
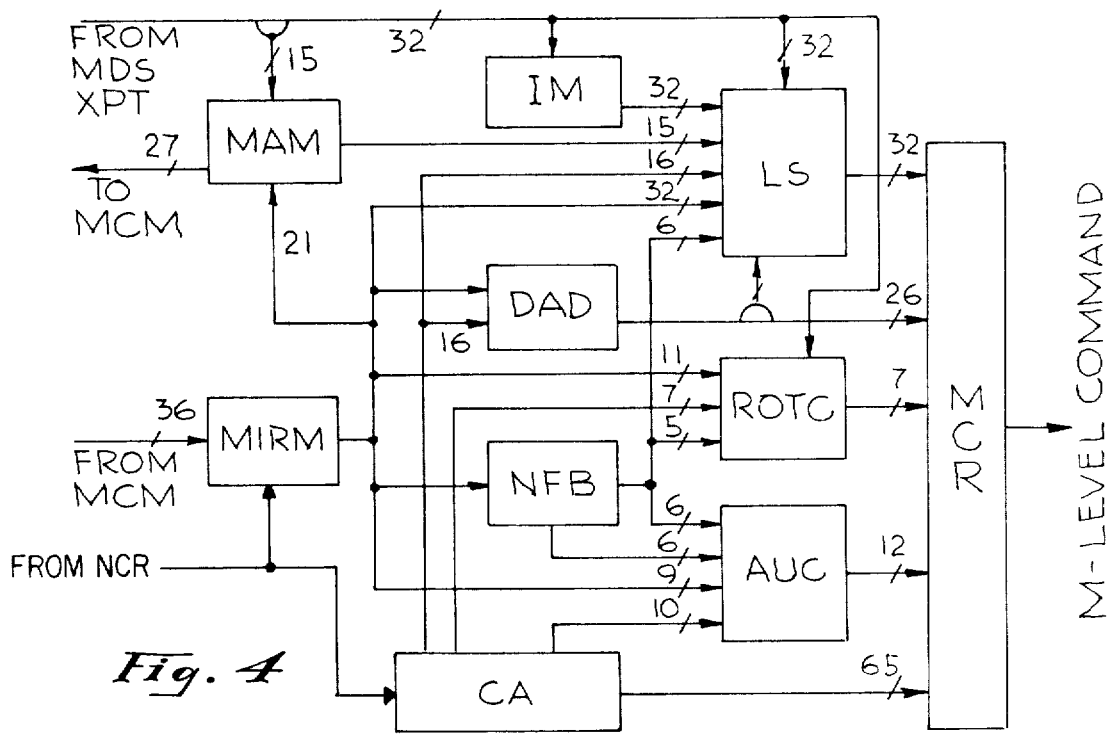
FIG. 4 is an electrical block diagram illustrating a preferred implementation of the N-level data section NDS of FIG. 2.

NDS primarily serves to decode M-ops using N-ops obtained from NCM which are addressed in response to address portions contained in the current M-op supplied by MCM. This decoding by NDS results in control signals being produced which are loaded into MCR, and from there are applied as an M-level Command to MDS where they control data movement and computation as required to perform the current M-op. FIG. 4 illustrates a preferred implementation of NDS. As was done in FIG. 3 for NDS, a number is provided adjacent each line in FIG. 4 to indicate the number of lines represented thereby for a typical embodiment. Implementations of the various components of FIG. 4 are described below.

M-OP INSTRUCTION RECEIVING MODULE MIRM (FIGS. 2 AND 4)

MIRM serves to receive and store an M-op while it is being executed. Typically, MIRM receives a 32 bit M-op from MCM including a condition signal which indicates whether the M-op is "privileged," and an additional signal which indicates that a "miss" occurred on the M-op fetched from MCM. The various bits of the received M-op form the major outputs of MIRM. These M-op bits are sent out to other modules in NDS for use in conjunction with the control signals provided by NCR (FIG. 2) for providing the various decoding functions required for the M-op, the results of which are set up in MCR (FIG. 4) for application to MDS (FIG. 2). Also, predetermined ones of the M-op bits are sent to NAM (FIG. 2) for use in branching and/or other decision making which may be required.

M-OP ADDRESSING MODULE MAM (FIG. 4)

MAM serves to provide for addressing of MCM (FIG. 2). The outputs of MAM are typically a 27 bit address which is sent to MCM, a 15 bit data path which is sent to the Literal Selector LS (FIG. 4) for state access, and condition lines for use in signaling an interrupt to an Interrupt Module IM (FIG. 4) when required. Inputs to MAM come from MIRM (FIGS. 3 and 4) and XPT (FIG. 3). These inputs are used for branch displacements and for setting registers within MAM.

COMMAND ARRAY CA (FIG. 4)

The Command Array CA operates as a read-only memory and serves to provide various control signals for NDS and also for MDS via MCR. The address for CA comes from the P-processor and is specified at the start of every N-level clock period by an N-op.

DAM ADDRESS DECODING MODULE DAD (FIG. 4)

DAD operates to convert pointer-relative DAM addresses into absolute DAM addresses. It has the capability to compute two addresses concurrently and accepts encoded addresses from any of three fields in MIRM (FIGS. 2 and 4). It also accepts indirect DAM addresses through a connection from XPT (FIG. 3).

N-LEVEL FUNCTION BOX NFB (FIG. 4)

NFB provides a general computation facility for use by the N-level programmer. The primary use of NFB is in bit-oriented operations, such as S-memory access. Inputs to NFB come from MIRM (FIGS. 2 and 4) and from XPT (FIG. 3). Typically, there are two data outputs from NFB. One output goes to an Arithmetic Unit Control module AUC (FIG. 4) for use in determining the bit width of an M-level arithmetic operation. The second output goes to a Rotator Control Module ROTC (FIG. 4) for use in providing an M-level rotation, and also goes to a Literal Selector LS (FIG. 4) for state access. The second output is also fed to the Arithmetic Unit Control AUC (FIG. 4) for applying the computation results thereto.

ARITHMETIC UNIT CONTROL MODULE AUC (FIG. 4)

AUC provides for two types of control for the M-level Arithmetic Unit AU (FIG. 3): (1) implicit control via MCR (FIGS. 2 and 4) using control signals derived from the P-processor (FIGS. 1 and 2), and (2) explicit control using control signals derived in response to predetermined bits of the M-ops. Accordingly, AUC in FIG. 4 obtains inputs from MIRM (FIGS. 2 and 4) and from the Command Array CA (FIG. 4).

ROTATE CONTROL MODULE ROTC (FIG. 4)

ROTC is a relatively simple module which chooses the source of the rotation quantity and function to be sent to the M-level Rotator R (FIG. 3) in response to signals from MIRM, CA and XPT (FIG. 3), thereby providing for shifting or rotating by an amount computed at the M-level. Typically, ROTC is entirely combinatorial.

LITERAL SELECTOR MODULE LS (FIG. 4)

LS serves to choose from among a number of inputs applied thereto a value to be sent to MDS (FIGS. 2 and 3) as a literal. Typically, there are three categories of inputs: Module State Access, Explicit Micro Literals, and Implicit Literals from CA. The Table below shows examples of typical input sources for LS and their category of use.

| SOURCE | USE |
| --- | --- |
| CA (FIG. 4) | Implicit literals, used by N-op programmer |
| MIRM (FIGS. 2 and 4) | Literals from microinstructions |
| XPT (FIG. 3) | State Access |
| DAD (FIG. 4) | State Access |
| NFB (FIG. 4) | State Access |
| IM (FIG. 4) | State Access |

MICRO CONTROL REGISTER MCR (FIGS. 2 AND 4)

MCR serves to latch the control signals required for MDS (FIG. 2). As such MCR captures bits of information generated by various other modules throughout NDS. Most of these MCR bits are sent as an M-level Command to MDS for controlling operations therein, while other MCR bits are typically sent to the System Timing Module STM (FIG. 2) to aid in the generation of the system clocks. Also, certain MCR bits are typically sent to an Interrupt Module IM (FIG. 4) to sample interrupt conditions which originate in MDS. The data inputs to MCR are typically obtained from the Command Array CA (FIG. 4), NCR (FIG. 2), and NDS modules (FIG. 4) such as DAD, LS, AUC and ROTC.

In effect MCR operates to latch M-level control signals while new signals are developed. This allows overlapped processing of multiple M-ops and the overlap of the decode and execute phases of simpler M-ops. While the bulk of the bits in MCR perform a control function for the M-level, there are also bits which carry data. These data bits are loaded from LS (FIG. 4) and sent to the M-level Crosspoint Unit XPT (FIG. 3). This path provides state access for registers in NDS and also provides a useful method for bringing literal fields from MIRM to MDS. MCR may also be used as a temporary register by the nanoprogrammer in complex microinstructions involving multiple M-level clocks.

INTERRUPT MODULE IM (FIG. 4)

An interrupt is a situation where the flow of control is changed implicitly as a result of an external stimulus or a request for an uninitialized or unavailable resource, or from the detection of an error condition. Examples of each of these categories are an I/O service request, a missing MAD during an AMU search on an S-memory access, and parity errors in DAM.

The Interrupt Module IM is responsible for detecting and logging the signals which indicate an interrupt condition. These conditions are developed for all of the P, N and M levels. There is a priority hierarchy for all interrupts. At any moment in time, operation will be occurring at some interrupt (priorty) level and no lower priority interrupts will occur. Higher priority signals are allowed to interrupt. In addition to priority control over interrupts, there also exist mask control over interrupts. Any interrupt level may be masked off so that an interrupt occurring at that level cannot interrupt the system.

Typically, there are three outputs from IM which go to the P-processor (FIG. 2). One of these indicates an "abort" condition while the other two indicate an interrupt condition occurring in two classes. These classes are interrupts which are honored only between M-ops and those interrupts which will occur between any N-level clock. Detected interrupts are reported to the P-processor during the N-level clock period following their occurrence.

P-PROCESSOR (FIG. 2)

The P-processor is comprised of three modules NAM (FIG. 2), NCR (FIGS. 2 and 4) and STM (FIG. 2) which control the execution of N-ops residing in the N-level Control Memory NCM (FIG. 2). As pointed out previously, in the preferred embodiment, the P-processor has a "hard" decoding structure, i.e., its control section is implemented in combinatorial elements which combinatorially generate control signals for the three modules. The three modules NAM, NCR and STM of the P-processor are described below.

N-OP ADDRESS MODULE NAM (FIG. 2)

The N-op Address Module NAM is the primary decision maker for the M-processor. It contains the N-op Address Register NAR (FIG. 2) which is used to address NCM. NAR is typically a 16 bit register of which ten bits are used to address NCM while the remaining six bits indicate various state conditions associated with both N-op and M-op processing. The addressing function performed by NAM is primarily controlled by "next state" information contained in the N-op. This next state information is fed to NAM from NCR. Fields included in the next state information may typically include a 16 bit possible next address, a 3 bit encoded addressing function, seven bits of condition selection information, and a single bit which enables processor interrupts. Also 2 bits are typically provided from the System Timing Module STM (FIG. 2) which are used for cycle control.

The basic NAM cycle may, for example, typically involve providing a starting address for NAR which is incremented zero, one, two or three times and then is replaced with a new value which is computed independently of the old NAR value. This cycle is tied to the control required for the current N-level clock period, which is variable in length. The length of both the L1 clock and the number of increments in the NAM cycle are both dictated by the N-op. During the increment phase of this cycle no decisions are made and no interrupts occur. It is an automatic cycle whose length is variable and whose end is indicated by information in the NCM location currently being accessed. This variable length cycle can be thought of as a method to concatenate (the access to) a number of words of NCM in order to form a variable length control pattern (M-level Command) for NDS (FIGS. 2 and 4). The computation of an entirely new address corresponds to the next set of NCR M-level Command signals and begins the sequential access phase all over again.

When there is a new NCM address computed, it may come from several places, depending on the addressing operation being performed. The simplest operation just selects the next address from the next state indicated by the N-op. This is used in the case of a direct sequence of N-level actions, without any need for decision making. Another operation takes this next state information and modifies a single bit on the basis of a condition signal. This allows N-op branching and decision making.

Other operations in NAM are N-op subroutine exits, which may typically take 8 bits of the next NAR value obtained from NCM, conditional exit or N-op branch, and operations which begin the interpretation of a new M-op. The starting address in NCM for the interpretation of an M-op may also be obtained, for example, by using the 8-bit op code of the M-op concatenated with two lower order zeros to form a 10-bit value. For sequential M-ops without conditional action, the next M-op is fetched (in turn) from MCM and therefore the next NAR state is also taken from the output of MCM. For a conditional M-op branch, the succeeding M-op is preloaded into MIR (FIGS. 2 and 4) while the "branch-taken" M-op is addressed by MAM (FIG. 4) and is available at the output of MCM. To implement the conditional M-op branch, the new state for NAR is taken from either MIR or MCM, as a conditional NAM operation.

A number of NAM operations may typically be provided for choosing a new M-op. The first type unconditionally uses the MCM output, a second type chooses between using the next state input (which continues the old M-op) or the MCM input, while the third type conditionally chooses between the MCM input and the op code in MIR. Should an "interrupt" or "miss" occur, the computed (or selected) next state value is gated off combinatorially. Combinatorial logic is used to insure that the proper "miss" and "interrupt" signals are used. In conditional operations this means that the choice is based on the outcome of the testing being performed, in the same fashion as the next state value is chosen. This combinatorial logic is also used to insure that interrupts which are honored only between M-ops are permitted to occur only if a new M-op is about to be started. Also, an interrupt enable bit is provided from NCR in order to permit an interrupt to occur.

Along with the address value, NAR also stores certain state information. Typically, one bit is provided to indicate if the block from which the M-op was taken is privileged. This information is used by IM (FIG. 4) in conjunction with data from NCM (FIG. 2) to detect illegal use of privileged instructions. Another bit indicates the impending start of a new M-op, while a third bit indicates when the first N-level action of an M-op provided in response to the output of NCR (FIGS. 2 and 4) is in progress. Another state bit in NAR is a bit indicating the presence or absence of an interrupt. This information is sent to STM (FIG. 2) to delay the N-level clock until new control information can be generated from NDS. This allows most problems to be detected and reported without the loss of irrecoverable data.

A further function which may be provided for NAM is the distribution of test results resulting from the decision making performed thereby. NAM indicates these results to both MAM and MIRM of NDS (FIG. 2). MAM receives a signal on which to base its own conditional operations while MIRM receives a signal to load MIR when appropriate.

N-OP CONTROL REGISTER NCR (FIG. 2)

NCR is used primarily to provide control signals for NDS (FIG. 2). It also provides a number of outputs used by NAM in determining the next NAR state. NCR additionally contains logic which is used in the basic cycle control of the P-processor. The major input to NCR is from NCM. Typically, there may be 157 bits of data output from NCR of which 85 bits go to NDS, 21 bits go to NAM, 6 bits go to STM, 6 bits go to MCM (FIG. 2), and the remaining 39 bits go back to NCR for use in loading NCM during system initialization.

SYSTEM TIMING MODULE STM (FIG. 2)

The STM is responsible for the generation and distribution of clocks and other timing signals throughout the various levels. The clock distribution is accomplished by supplying all modules with a basic high speed clock and a properly timed enable signal. Within each level there is clock distribution logic which produces the "AND" of the clock and the enable for all of the registers which receive a clock. Typically, the frequency of the basic clock may be 40 MHz, allowing a 25 nanosecond incremental resolution in the period of Level P, N and M clocks. The master program clock may, for example, be 10 MHz.

In the preferred embodiment, the P-level clock L0 is issued as follows: (1) there is always an L0 clock issued so as to be in coincidence with an N-level clock L1; (2) another L0 clock is issued two basic periods before an L1 clock and is used to load the next (computed and selected) state of NAM into NCR; and (3) L0 clocks are also issued to provide a sequence of clocks following L1 which are used in loading NCR, these being spaced two basic periods apart to allow time for the N-op accessed from NCM to reach NCR. Sufficient L0 clocks are issued to provide the required loading. The minimum number of P-level clocks L0 is two for each L1 clock, one for use in loading NCR, and another to load the next state into NAR. L0 is also used in NAM to increment NAR.

PART III—SYSTEM OPERATION

Figure 5:
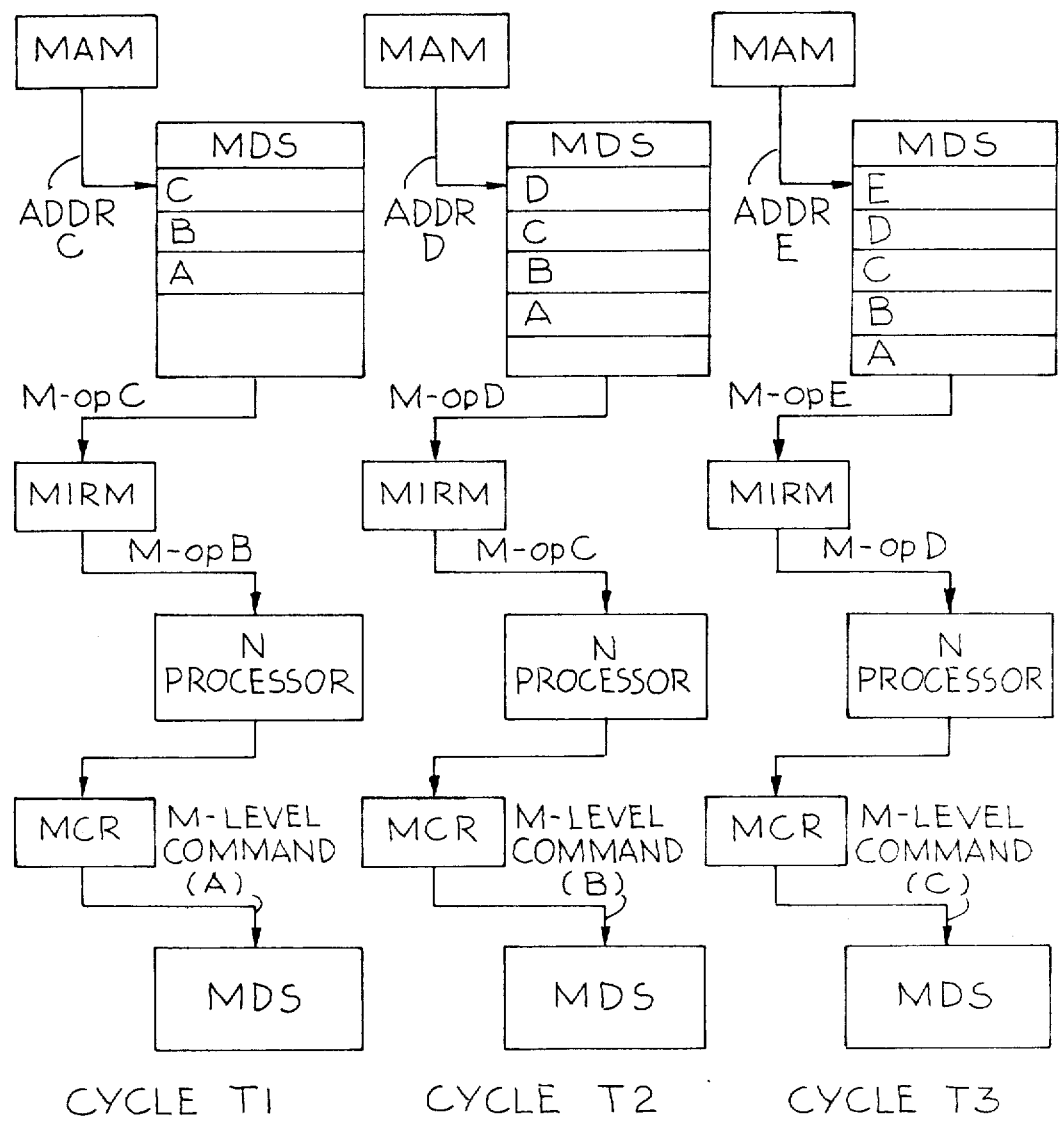
FIG. 5 is a schematic diagram illustrating how M instructions (M-ops) are processed in a three stage pipeline.

Processing M-ops (FIG. 5)

In the preferred embodiment being described herein, M-ops are processed in a three stage pipeline. The processing done in each stage corresponds to M-op fetch, M-op decode, and M-op execute operations. MAM, MIRM and MCR contained in NDS (FIGS. 2 and 4) each contain storage means which serve to separate the three stages in order to allow the processing of all three stages to proceed concurrently. For example, refer to FIG. 5 which illustrates three cycles T1, T2 and T3. If A, B and C are three consecutive M-ops, then, for cycle T1, MAM contains the address of C for addressing MCM for fetching C therefrom, MIRM contains B for decoding by NDS, and MCR contains the results of decoding A for providing an M-level Command which is executed within MDS, all of these fetching, decoding and executing operations being performed concurrently during the cycle. When these concurrent operations are completed during T1, then MAM, MIRM and MCR are loaded with new data for the next cycle T2, MAM being updated to contain the address of the next M-op, D, MIRM receiving the newly fetched C M-op, and MCR receiving the results of the decoding of B so as to provide a new M-level Command to MDS. Similarly, for the next cycle T3, MAM will be updated to contain the address of the next M-op, E, MIRM will receive the M-op D, and MCR will receive the results of the decoding of C so as to provide the next M-level Command to MDS.

As mentioned previously, the P-processor may take more than one step to decode and execute an M-level Command. In such a case MIRM is not loaded with a new M-op until NDS finishes its last decode step on the old M-op.

Figure 6:
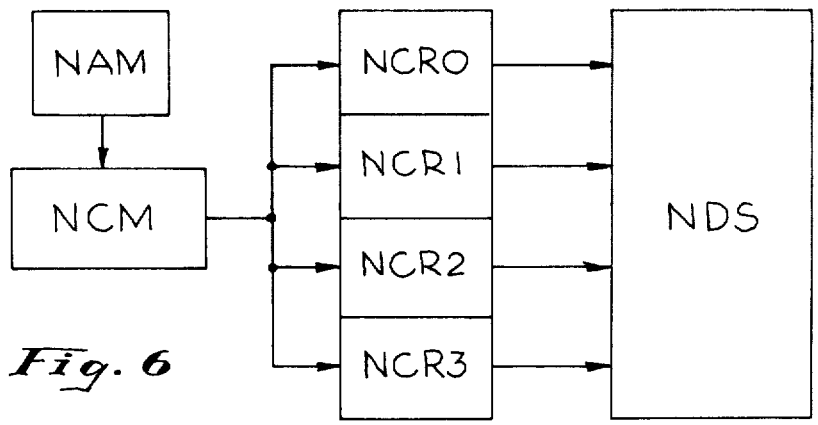
FIG. 6 is an electrical block diagram illustrating the fetching and processing of N instructions (N-ops) in the implementation of FIG. 5.
Figure 7:
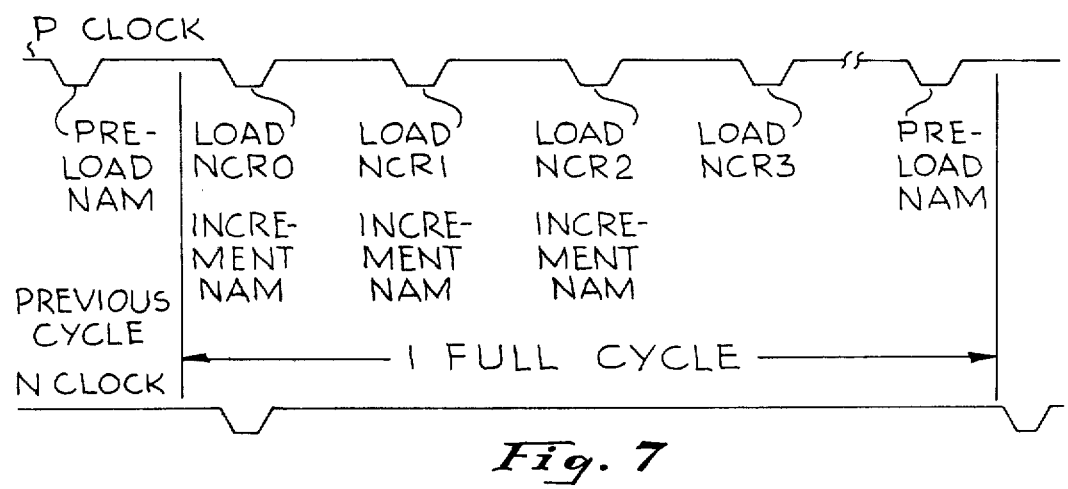
FIGS. 7 and 8 are timing diagrams illustrating two exemplary N-op processing cycles.
Figure 8:
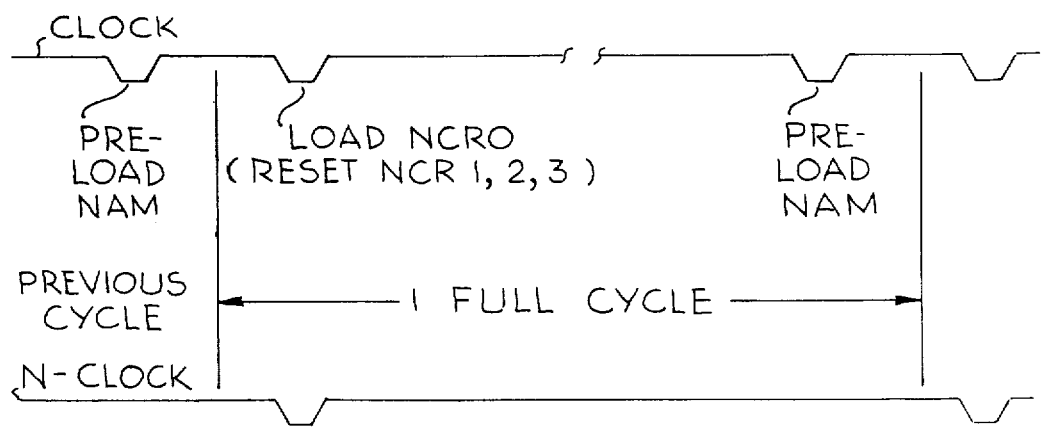

Processing N-ops (FIGS. 6-8)

N-ops are processed in a variable length cycle, as pointed out previously. N-ops are fetched from NCM (FIG. 2), one at a time in response to N-op addresses provided by NAM, the fetched N-op being loaded into NCR. As each N-op fetched from NCM is clocked into NCR, the address provided by NAM is changed. The final step in any single cycle is the loading of a new address for NAM which will be used in the next cycle. This pre-loading of the next cycle N-op starting address in the end of the previous cycle provides overlap in the processing of N-ops. Conditional branches are implemented by NAM in response to the receipt of appropriate test and condition signals for use in choosing between a plurality of possible next N-op addresses.

As illustrated in FIG. 6, NCR (FIG. 2) is typically comprised of the four registers NCR0, NCR1, NCR2, and NCR3. Since the N-op processing cycle is aligned with the N-level clock period which is performing M-op decoding, the start of an N-level Action is the start of a P-level cycle as well. FIGS. 6 and 7 illustrate an N-op processing cycle which requires loading of all four NCR registers in order to provide an N-level Command. FIG. 8 illustrates an N-op cycle which requires loading of only NCR0 in order to provide the desired N-level Command, which is the minimum cycle permitted.

EXAMPLE OF SYSTEM OPERATION

For the purposes of this example, the performance of a specific M-op will be considered and will be designated by the letter J. The operation performed by this J M-op may be summarized as follows:

J M-op—Move a Canonical Descriptor from addresses X and X+1 in DAM (FIG. 3) to DAM addresses Y and Y+1, respectively.

Referring to FIG. 2, it will be understood that the initial part of this example involves applying the address of M-op J to MAM for fetching J from MCM, which upon being fetched is then loaded into MIRM. Concurrently with the loading of J into MIRM, the op code portion of J is applied to NAM which in response thereto provides addresses for sequentially fetching a particular plurality of N-ops from NCM which are loaded into NCR. For the J M-op of this example, two N-ops will be assumed to be provided which will be designated as N-op$_1$ and N-op$_2$. N-op$_1$ causes the P-processor to provide (via NCR) a first N-level Command to NDS which controls DAD (FIG. 4) in a manner such that appropriate portions of M-op J contained in MIRM are decoded by DAD (FIG. 3) to provide DAM addresses X and Y which are then loaded into MCR. This first N-level Command produced in response to N-op$_1$ also causes appropriate control information to be loaded into MCR from the Command Array CA (FIG. 4) which together with the DAM addresses X and Y loaded into MCR constitute a first M-level Command for MDS. This first M-level Command is applied to MDS during the next N-op cycle at which time NCR will have been updated to provide a second N-level Command in response to N-op$_2$. Thus, the decoding to be performed by NDS in response to this second N-level Command will be concurrently performed by NDS while the first M-level Command is being executed by MDS.

The first M-level Command applied to MDS causes the first portion of the Canonica Descriptor stored at address X of DAM (FIG. 3) to be read therefrom and written back at DAM address Y. Concurrently with this execution of the first M-level Command, the second N-level Command will control DAD (FIG. 4) to now produce DAM addresses X+1 and Y+1 which are loaded into MCR, and which along with control information provided by CA (FIG. 4), constitutes a second M-level Command. Thus, during the next cycle, this second M-level Command applied to MDS now causes the second portion of the Canonical Descriptor stored at address X+1 of DAM to be read out therefrom and written back at DAM address Y+1, thereby completing the J M-op.

It is to be understood that the particular embodiments considered herein are merely illustrative, and that the present invention is subject to a wide variety of modifications and variations in construction, arrangement and use without departing from the scope of the invention. Accordingly, the present invention is to be considered as including all possible modifications and variations coming within the scope of the invention as defined by the appended claims.

What is claimed is:

1. In an interpretive-type electronic digital data processing system for performing data processing operations, the combination comprising:

a multi-level hierarchy of processors for performing data processing operations, said hierarchy of processors being designatable in descending hierarchical order as S, M, N and P processors and being constructed and arranged such that said M-processor serves as a control section of said S-processor, said N-processor serves as a control section for said M-processor and said P-processor serves as a control section for said N-processor;

said S-processor including an S memory for storing S instructions corresponding to one or more high level languages;

said M-processor including an M memory for storing M instructions;

said N-processor including an N memory for storing N instructions;

means for applying S instructions to said N-processor;

said N-processor including means responsive to an applied S instruction for fetching a selected one or more M instructions from said M memory and for applying the fetched one or more M instructions to said P-processor;

said P-processor including means responsive to a fetched M instruction for fetching a selected one or more N instructions from said N memory and in response thereto producing an N-level command which is applied to said N-processor;

said N-processor being responsive to an applied N-level command for processing a fetched M instruction to produce an M-level command which is applied to said M-processor;

said M-processor being responsive to said M-level command for processing applied data in accordance therewith;

said M-processor also comprising S memory access protection means including a selectively addressable memory containing S memory access rights data which are selectively referenced for each access to said S memory so as to prevent improper access to data stored therein.

2. The invention in accordance with claim 1, wherein said M-processor includes an M data section for receiving applied data and for processing said data in accordance with said M-level command, and wherein said N-processor includes an N data section to which a fetched M instruction is applied along with said N-level command, said N data section operating to process said M instruction in accordance with said N-level command for producing said M-level command.

3. The invention in accordance with claim 2, wherein said N-processor also includes M instruction addressing means and M instruction storing means, said M instruction addressing means being responsive to an applied S instruction for fetching a selected one or more M instructions from said M memory and for storing the fetched M instruction in said M instruction storing means.

4. The invention in accordance with claim 3, wherein said P-processor includes N instruction addressing means responsive to a fetched microinstruction for fetching a selected one or more N instructions from said N memory.

5. The invention in accordance with claim 4, wherein said N data section of said N-processor includes M command storage means for storing an M-level command produced thereby, and said P-processor includes N command storage means for storing an N-level command produced thereby.

6. The invention in accordance with claim 1, 2, 3, 4 or 5, wherein means are provided for concurrently performing the operations of fetching an M instruction, processing an M instruction in accordance with an N-level command, and processing data in accordance with an M-level command.

7. The invention in accordance with claim 5, wherein means are provided for concurrently performing the operations of fetching an M instruction for storing in said M instruction storing means, processing an M instruction in accordance with an N-level command for producing an M-level command for storing in said M command storage means, and processing data in accordance with an M-level command.

8. The invention in accordance with claim 7, wherein said system operates in a cyclical manner such that during a cycle said N-processor operates to fetch an M instruction from said M memory in response to an address applied from said M instruction addressing means for storing in said M instruction storing means at the end of the cycle, said N-processor also operates to cause an M instruction in said M instruction storing means to be processed by said N data section in accordance with an N-level command applied from said N command storage means so as to produce an M-level command for storing in said M command register at the end of the cycle, and said M-processor operates to cause said M data section to process data in accordance with an M-level command applied from said M command register.

9. The invention in accordance with claim 1, 2, 3, 4, 5, 6, 7 or 8, wherein said selectively addressable memory is an associative memory which is automatically searched in response to data incorporated in an S memory address requesting access to said S memory for corresponding S memory access rights data indicating whether the requested S memory access is to be permitted.

10. The invention in accordance with claim 9, wherein said associative memory stores a plurality of S memory access descriptors each of which comprises a key and S memory access rights data applicable to particular data stored in said S memory, and wherein S memory addresses each include a corresponding key which is used in associatively searching said associative memory to select a corresponding S memory access descriptor to determine applicable access rights prior to permitting access to said S memory.

11. The invention in accordance with claim 10, wherein said protection means includes a direct access memory for storing said S memory addresses.

12. The invention in accordance with claim 9, wherein each S memory address stored in said direct access memory also includes a language dependent key relating to a particular input high level language.

* * * * *

UNITED STATES PATENT AND TRADEMARK OFFICE
CERTIFICATE OF CORRECTION

PATENT NO. : 4,346,436
DATED : August 24, 1982
INVENTOR(S) : John B. Wise

It is certified that error appears in the above—identified patent and that said Letters Patent is hereby corrected as shown below:

Col. 4, line 21, change "point-relative" to --pointer-relative--.
Col. 16, line 22, change "Canonica" to --Canonical--;
line 54, change "of" to --for--.

Signed and Sealed this

Twenty-sixth Day of October 1982

[SEAL]

Attest:

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,346,436
DATED : August 24, 1982
INVENTOR(S) : John B. Wise

It is certified that error appears in the above-identified patent and that said Letters Patent is hereby corrected as shown below:

The term of this patent subsequent to August 24, 1999, has been disclaimed.

Signed and Sealed this

Third Day of September 1985

[SEAL]

Attest:

DONALD J. QUIGG

Attesting Officer    Acting Commissioner of Patents and Trademarks - Designate